United States Patent
Takazawa et al.

(10) Patent No.: US 12,420,686 B2
(45) Date of Patent: Sep. 23, 2025

(54) CUSHION SKIN, SEAT CUSHION, AND VEHICLE SEAT

(71) Applicants: NHK SPRING CO., LTD., Yokohama (JP); SUBARU CORPORATION, Tokyo (JP)

(72) Inventors: Syunji Takazawa, Yokohama (JP); Hideki Hasumi, Yokohama (JP); Atsushi Kageyama, Yokohama (JP); Fumito Kitanaka, Tokyo (JP); Kenji Nagumo, Tokyo (JP)

(73) Assignees: NHK Spring Co., Ltd., Yokohama (JP); SUBARU CORPORATION, Tokyo (JP)

( * ) Notice: Subject to any disclaimer, the term of this patent is extended or adjusted under 35 U.S.C. 154(b) by 181 days.

(21) Appl. No.: 18/482,534

(22) Filed: Oct. 6, 2023

(65) Prior Publication Data
US 2024/0116416 A1    Apr. 11, 2024

(30) Foreign Application Priority Data

Oct. 7, 2022  (JP) ................. 2022-162774

(51) Int. Cl.
*B60N 2/58*    (2006.01)

(52) U.S. Cl.
CPC ................. *B60N 2/5816* (2013.01)

(58) Field of Classification Search
CPC ...... B60N 2/58; B60N 2/5816; B60N 2/5825; B60N 2/6027
USPC .................................................... 297/452.62
See application file for complete search history.

(56) References Cited

U.S. PATENT DOCUMENTS

| | | | | |
|---|---|---|---|---|
| 2009/0146483 A1* | 6/2009 | Niwa | ....................... | B60N 2/58 |
| | | | | 112/475.08 |
| 2010/0102601 A1* | 4/2010 | Yasuda | ................... | B60N 2/58 |
| | | | | 297/188.04 |
| 2015/0336491 A1* | 11/2015 | Abe | ........................ | B60N 2/68 |
| | | | | 297/452.48 |
| 2019/0143859 A1* | 5/2019 | Sakoda | ................ | A47C 31/02 |
| | | | | 297/218.1 |

FOREIGN PATENT DOCUMENTS

| | | | | | |
|---|---|---|---|---|---|
| CN | 115230547 A | * | 10/2022 | ............. | B60N 2/58 |
| EP | 3811824 B1 | * | 8/2023 | ........... | A47C 31/023 |
| JP | 2014-150916 A | | 8/2014 | | |
| JP | 7214947 B2 | * | 1/2023 | | |

(Continued)

*Primary Examiner* — Jason D Shanske
(74) *Attorney, Agent, or Firm* — Knobbe, Martens, Olson & Bear, LLP (57) ABSTRACT

In a cushion skin, left and right side surface skin front portions are fixed to a cushion frame of the seat cushion. The left and right side surface skin rear portions are respectively connected to the left and right side surface skin front portions, and each have a lower extending portion extending downward of the rear portion of the cushion pad. The connecting portion is disposed at the lower side of the rear portion of the cushion pad, and connects the distal end portions of each lower extending portion of the left and right side surface skin rear portions in the seat left-right direction. In each lower extending portion, a front side in the seat front-rear direction expands wider outward in the seat left-right direction than a rear side.

4 Claims, 12 Drawing Sheets

(56) References Cited

FOREIGN PATENT DOCUMENTS

| JP | 7313798 B2 | * | 7/2023 | |
|---|---|---|---|---|
| WO | WO-2021117856 A1 | * | 6/2021 | ............... B60N 2/58 |
| WO | WO-2023145646 A1 | * | 8/2023 | ............... B68G 7/05 |

* cited by examiner

CUSHION SKIN, SEAT CUSHION, AND VEHICLE SEAT

CROSS-REFERENCE TO RELATED APPLICATION

This application is based on and claims priority under 35 USC 119 from Japanese Patent Application No. 2022-162774, filed on Oct. 7, 2022, the disclosure of which is incorporated by reference herein.

BACKGROUND

Technical Field

The present disclosure relates to a vehicle seat, and particularly to a cushion skin of a seat cushion.

Related Art

In the seat cushion described in Japanese Patent Application Laid-Open (JP-A) No. 2014-150916, a seat cushion pad is placed on a seat cushion frame, the seat cushion frame and the seat cushion pad are covered with a skin material, a locking portion provided at a peripheral edge portion of the skin material is locked to a locked portion formed in the seat cushion frame, a stretchable strip material is bridged over both left and right side portions of a rear end portion of the skin material, and an annular portion including the rear end portion of the skin material and the strip material is elastically covered on a rear end portion of the seat cushion pad.

SUMMARY

When an occupant gets in a vehicle, buttocks and thighs of the occupant rub against a vehicle outer portion of a cushion skin, so that the vehicle outer portion of the cushion skin tends to be displaced to a vehicle inner side. However, since a fixing portion of the cushion skin to a cushion frame is not displaced, a tension is generated in a part of the cushion skin. Repeated generation of such a tension may cause wrinkles on the cushion skin.

In view of the above fact, an object of the present disclosure is to provide a cushion skin, a seat cushion, and a vehicle seat capable of suppressing generation of wrinkles in the cushion skin due to a tension generated in the cushion skin when an occupant gets in a vehicle.

A cushion skin according to a first aspect of the present disclosure is a cushion skin covering a cushion pad of a seat cushion of a vehicle seat, the cushion skin including: left and right side surface skin front portions that are respectively disposed at left and right side surfaces of the seat cushion and are fixed to a cushion frame of the seat cushion; left and right side surface skin rear portions that are respectively disposed at left and right side surfaces of the seat cushion at a seat rear side of the left and right side surface skin front portions, that are respectively connected to the left and right side surface skin front portions, and that each have a lower extending portion extending downward of a rear portion of the cushion pad; and a connecting portion that is disposed at a lower side of the rear portion of the cushion pad and connects distal end portions of each lower extending portion of the left and right side surface skin rear portions in a seat left-right direction, in which, in each lower extending portion, a front side in a seat front-rear direction expands wider outward in the seat left-right direction than a rear side.

According to the first aspect, the cushion skin covering the cushion pad of the seat cushion of the vehicle seat includes left and right side surface skin front portions, left and right side surface skin rear portions, and a connecting portion. The left and right side surface skin front portions are respectively disposed at the left and right side surfaces of the seat cushion, and are fixed to the cushion frame of the seat cushion. The left and right side surface skin rear portions are respectively disposed at the left and right side surfaces of the seat cushion at a seat rear side of the left and right side surface skin front portions, that are respectively connected to the left and right side surface skin front portions, and that each have a lower extending portion extending downward of the rear portion of the cushion pad. The connecting portion is disposed at the lower side of the rear portion of the cushion pad, and connects the distal end portions of each lower extending portion of the left and right side surface skin rear portions in the seat left-right direction. As a result, the rear portion of the cushion skin including the left and right side surface skin rear portions and the connecting portion are restrained by the cushion pad.

When the occupant gets in the vehicle, the buttocks and thighs of the occupant rub against the vehicle outer portion of the cushion skin, so that the vehicle outer portion of the cushion skin tends to be displaced to the vehicle inner side. At this time, since the rear portion of the cushion skin which is not fixed to the cushion frame is easily displaced to the vehicle inner side, a high tension is hardly generated in a part of the cushion skin. In addition, in each lower extending portion of the left and right side surface skin rear portions connected to the left and right side surface skin front portions, a front side in the seat front-rear direction expands wider outward in the seat left-right direction than the rear side. Therefore, the side surface skin rear portion on the vehicle outer side easily follows the displacement of the side surface skin front portion on the vehicle outer side. As a result, generation of wrinkles on the cushion skin can be suppressed.

In a cushion skin according to a second aspect, in the first aspect, the left and right side surface skin front portions are fixed to the cushion frame by one or more fixtures disposed along the seat front-rear direction.

In the cushion skin of the second aspect, the left and right side surface skin front portions are fixed to the cushion frame by the one or more fixtures disposed along the seat front-rear direction. As a result, when the occupant gets in the vehicle, the vehicle outer portion of the cushion skin is less likely to be displaced to the vehicle inner side, and the side surface skin rear portion on the vehicle outer side follows the displacement of the side surface skin front portion on the vehicle outer side, so that a part of the cushion skin is less likely to be twisted. As a result, generation of wrinkles on the cushion skin can be more effectively suppressed.

A seat cushion according to a third aspect includes a cushion frame, a cushion pad that is supported by the cushion frame, and the cushion skin according to the first aspect or the second aspect, the cushion skin covering the cushion pad.

In the seat cushion of the third aspect, the cushion skin covers the cushion pad supported by the cushion frame. Since this cushion skin is one according to the first aspect or the second aspect, the above-described action and effect can be obtained.

A vehicle seat according to a fourth aspect includes the seat cushion according to the third aspect, a seat back that supports a back of an occupant seated on the seat cushion, and a headrest that supports a head of the occupant.

In the vehicle seat of the fourth aspect, the back of the occupant seated on the seat cushion is supported by the seat back, and the head of the occupant is supported by the headrest. Since the seat cushion is one according to the third aspect, the above-described action and effect can be obtained.

As described above, in a cushion skin, a seat cushion, and a vehicle seat according to the present disclosure, it is possible to suppress generation of wrinkles in the cushion skin due to a tension generated in the cushion skin when an occupant gets in a vehicle.

BRIEF DESCRIPTION OF THE DRAWINGS

Exemplary embodiments of the present invention will be described in detail based on the following figures, wherein.

DETAILED DESCRIPTION

Hereinafter, a vehicle seat 10 according to an embodiment of the present disclosure will be described with reference to FIGS. 1 to 14. Note that in each drawing, some reference numerals may be omitted in order to make the drawing easy to see. Arrows FR, LH, RH, and UP appropriately described in the drawings indicate front, left, right, and upper sides of the vehicle seat 10, respectively. Hereinafter, when the description is simply made using the front-rear, left-right, and up-down directions, directions with respect to the vehicle seat 10 are indicated.

Figure 1:
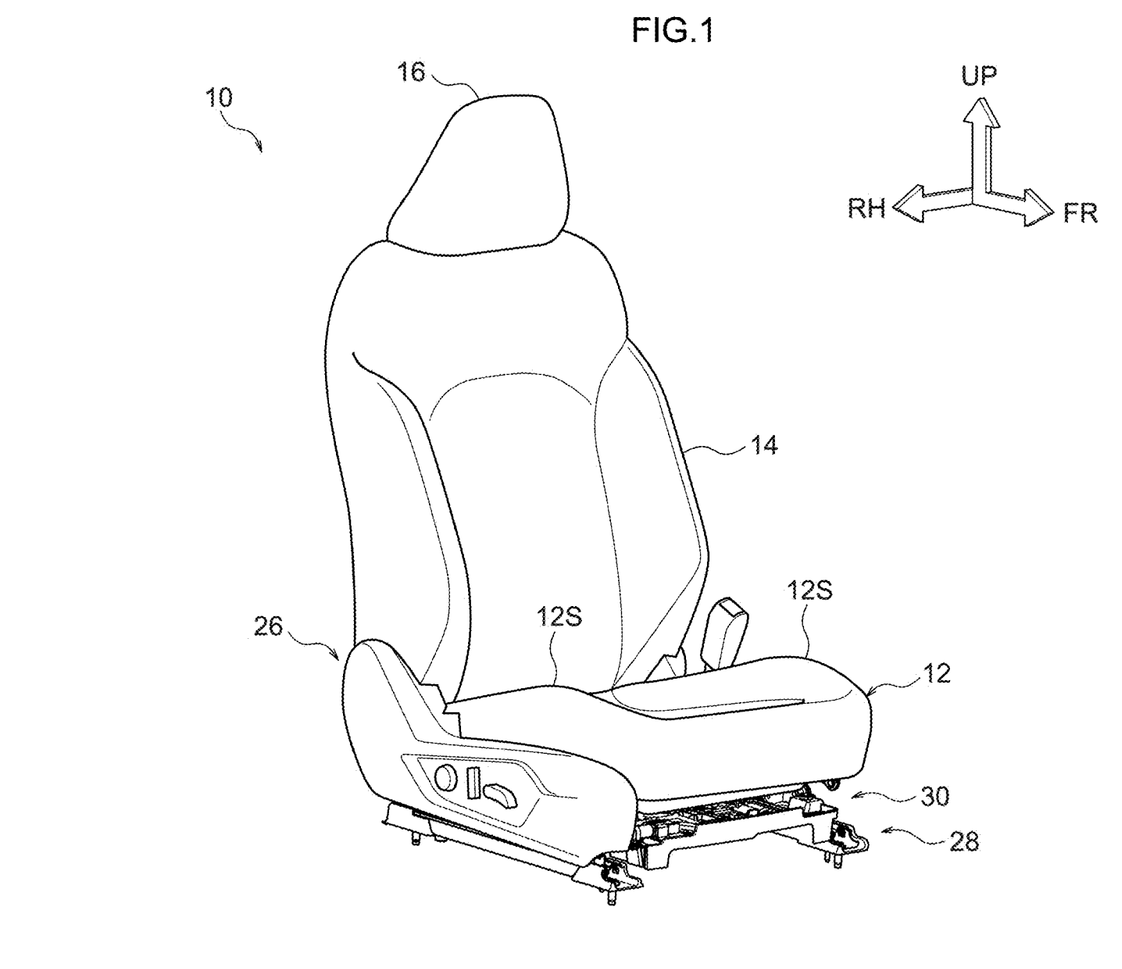
FIG. 1 is a perspective view illustrating a vehicle seat according to an embodiment.
Figure 2:
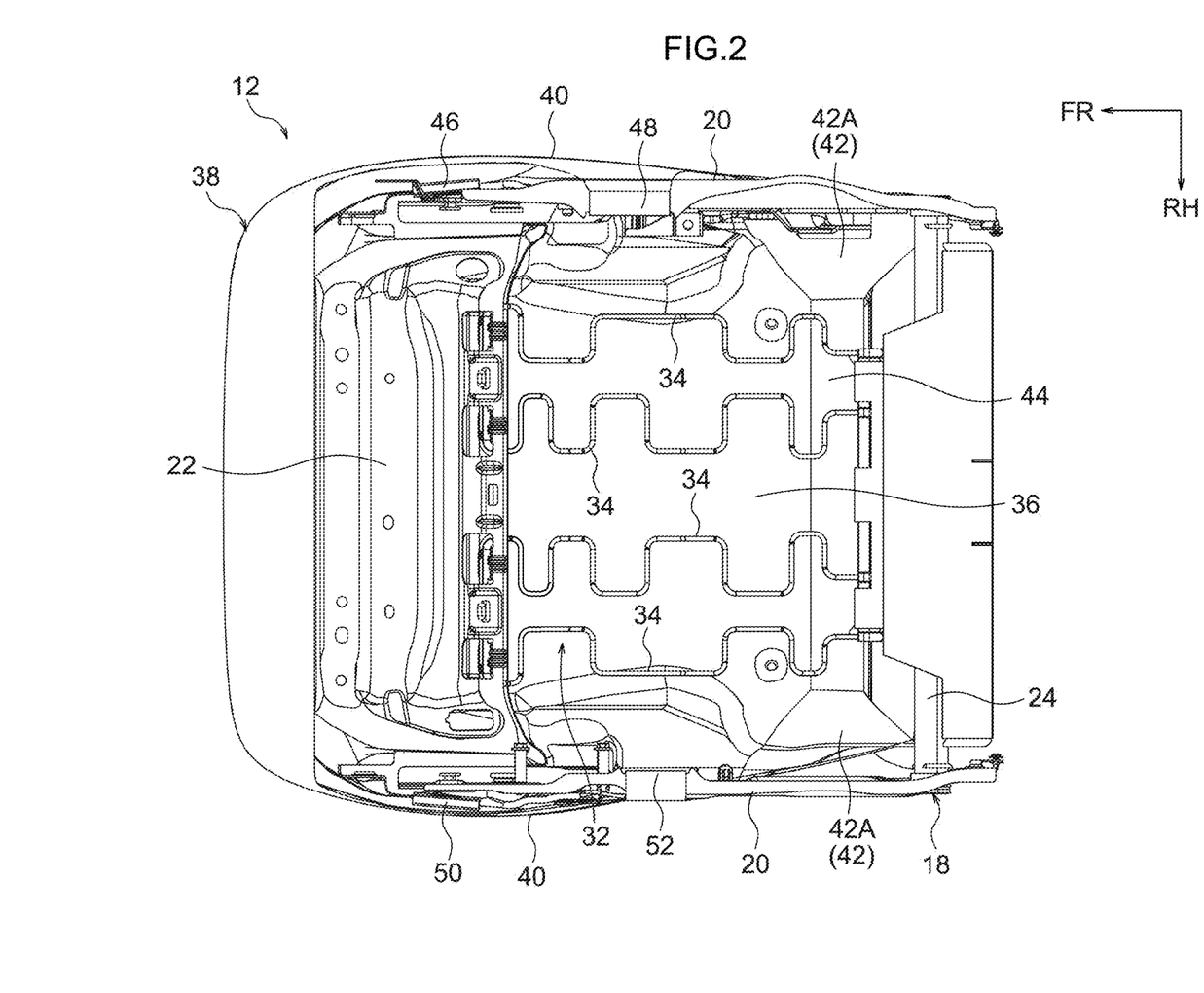
FIG. 2 is a bottom view illustrating a seat cushion of the vehicle seat according to the embodiment.
Figure 3:
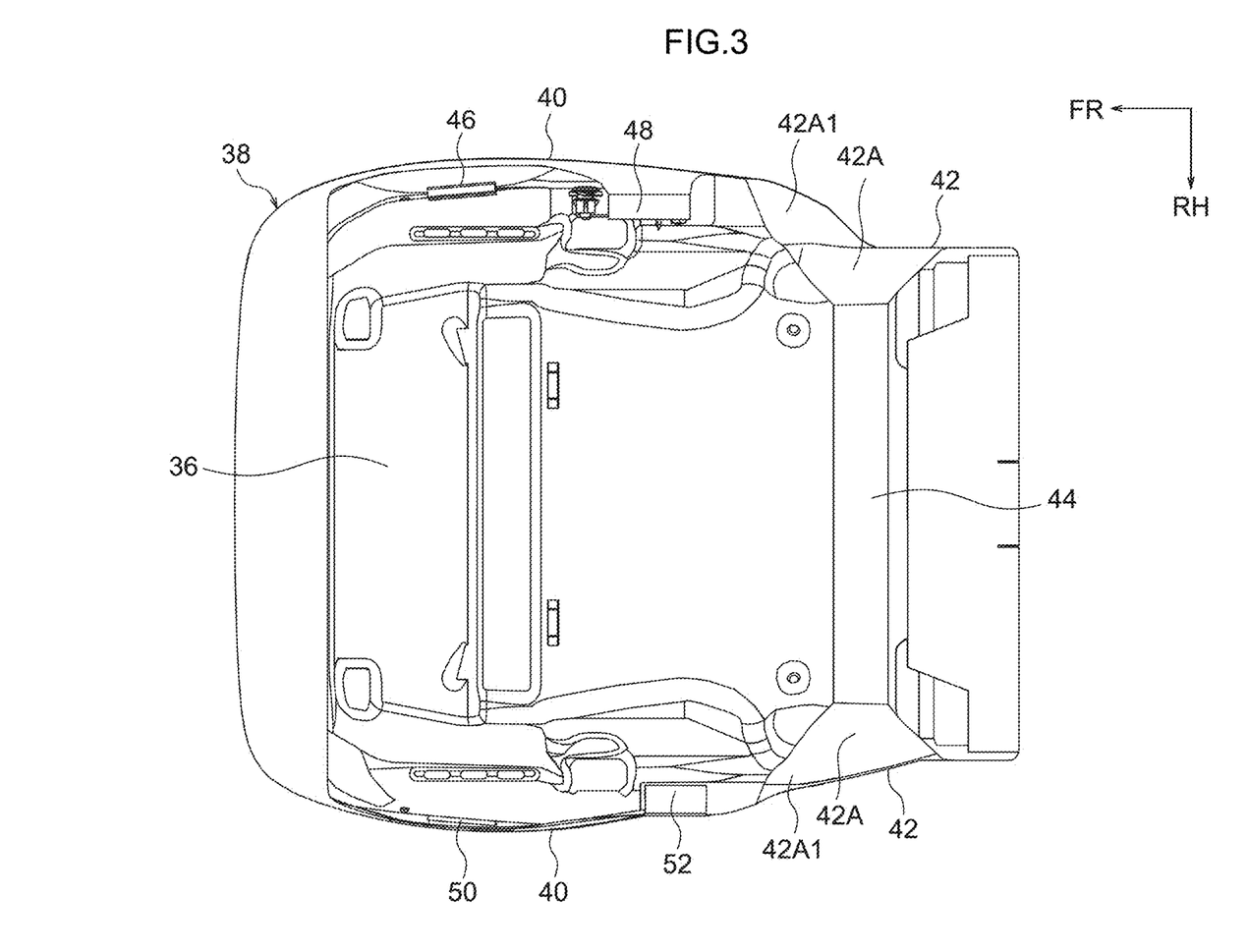
FIG. 3 is a view illustrating a state in which a cushion frame and a cushion spring are removed from a configuration illustrated in FIG. 2.
Figure 4:
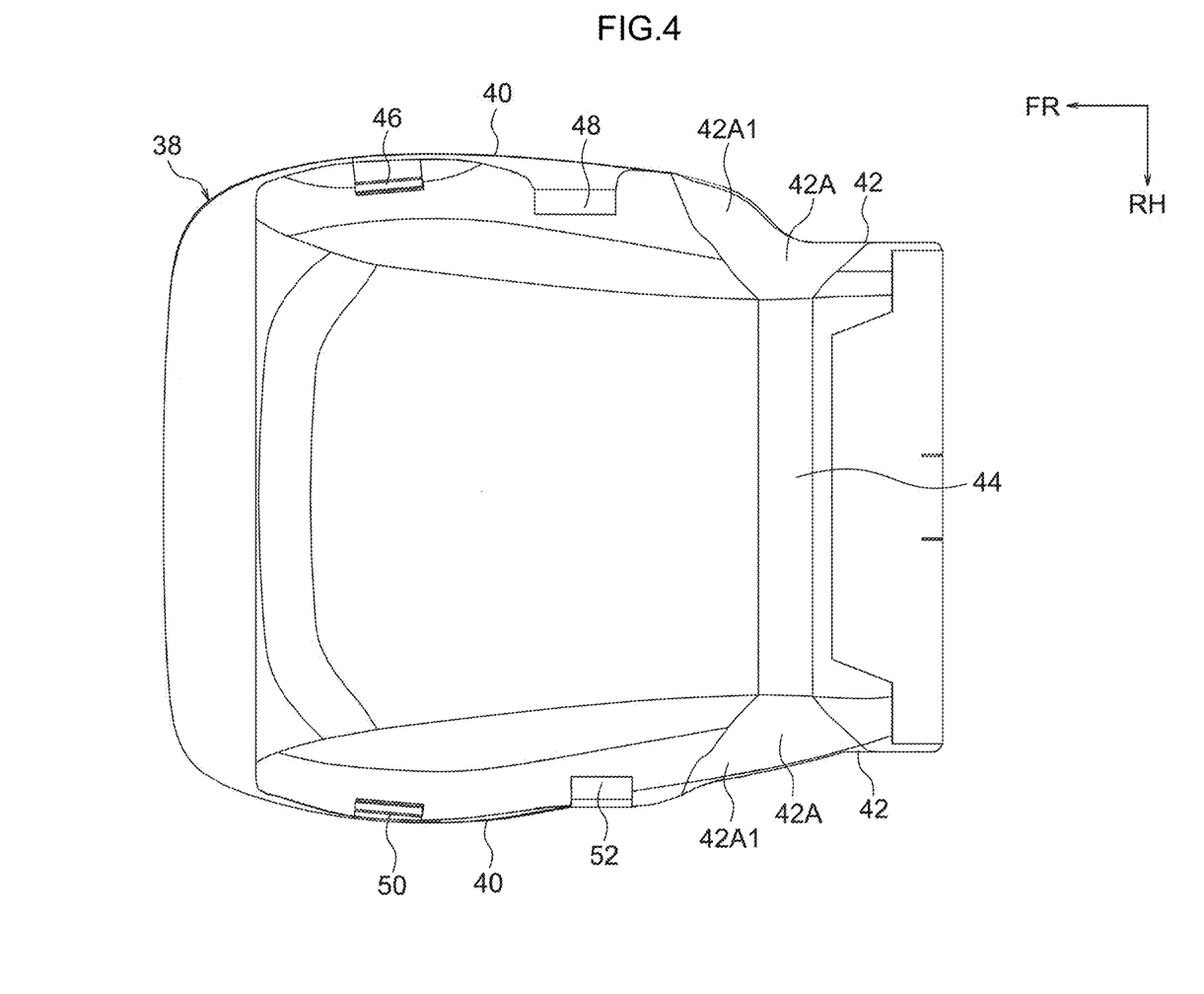
FIG. 4 is a view illustrating a state in which a cushion pad is removed from a configuration illustrated in FIG. 3.
Figure 5:
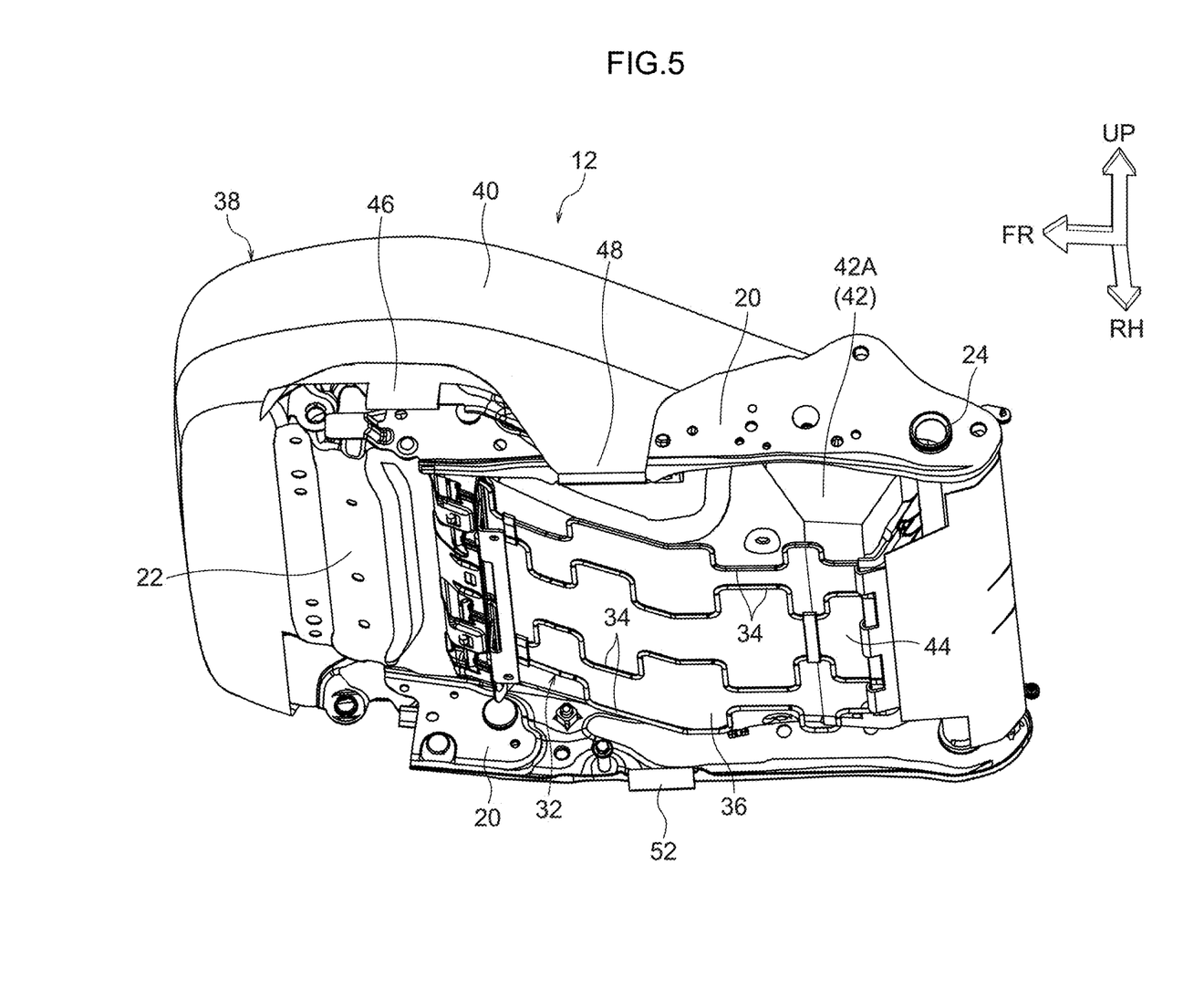
FIG. 5 is a perspective view illustrating the seat cushion according to the embodiment.
Figure 6:
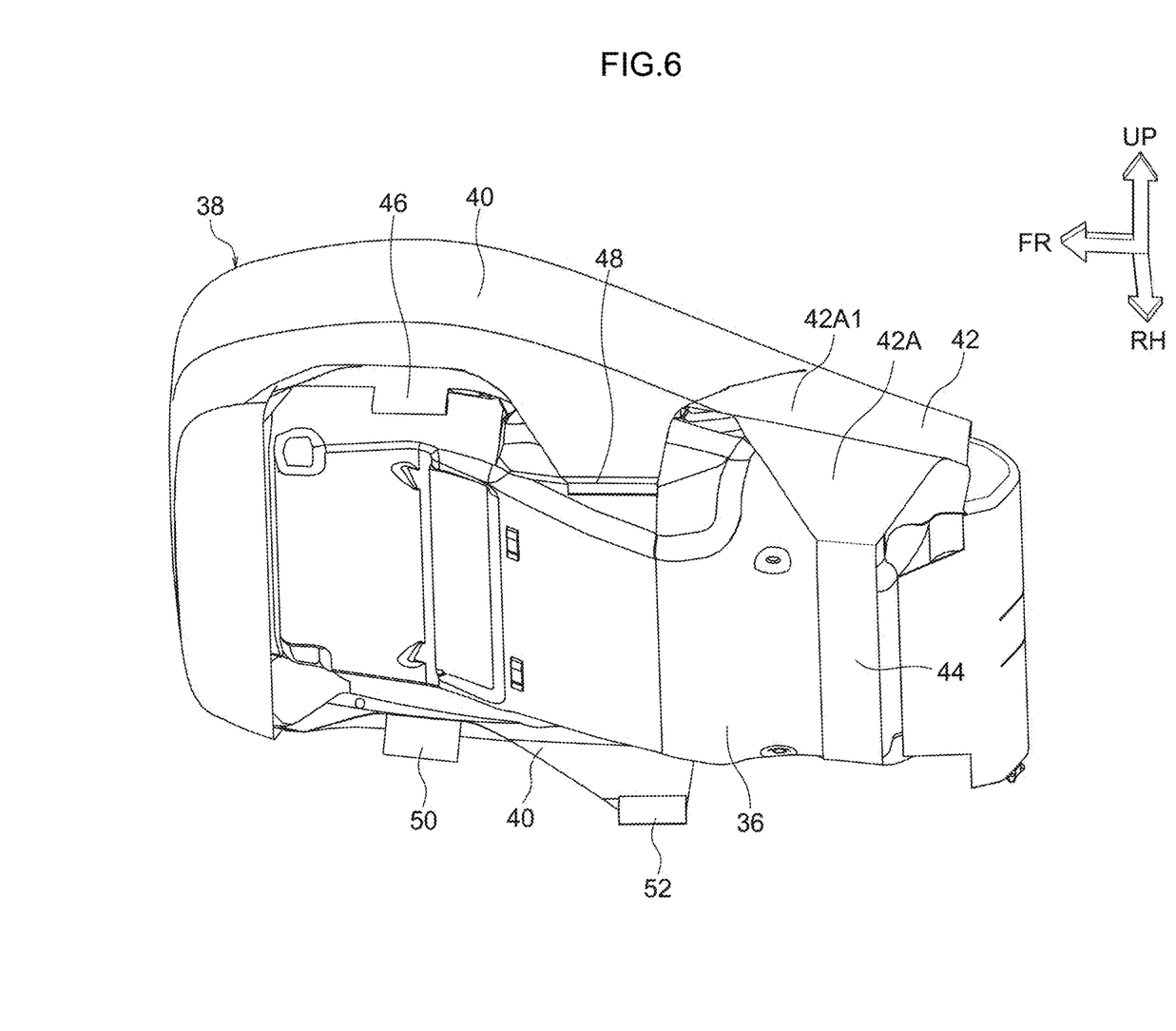
FIG. 6 is a view illustrating a state in which a cushion frame and a cushion spring are removed from a configuration illustrated in FIG. 5.
Figure 7:
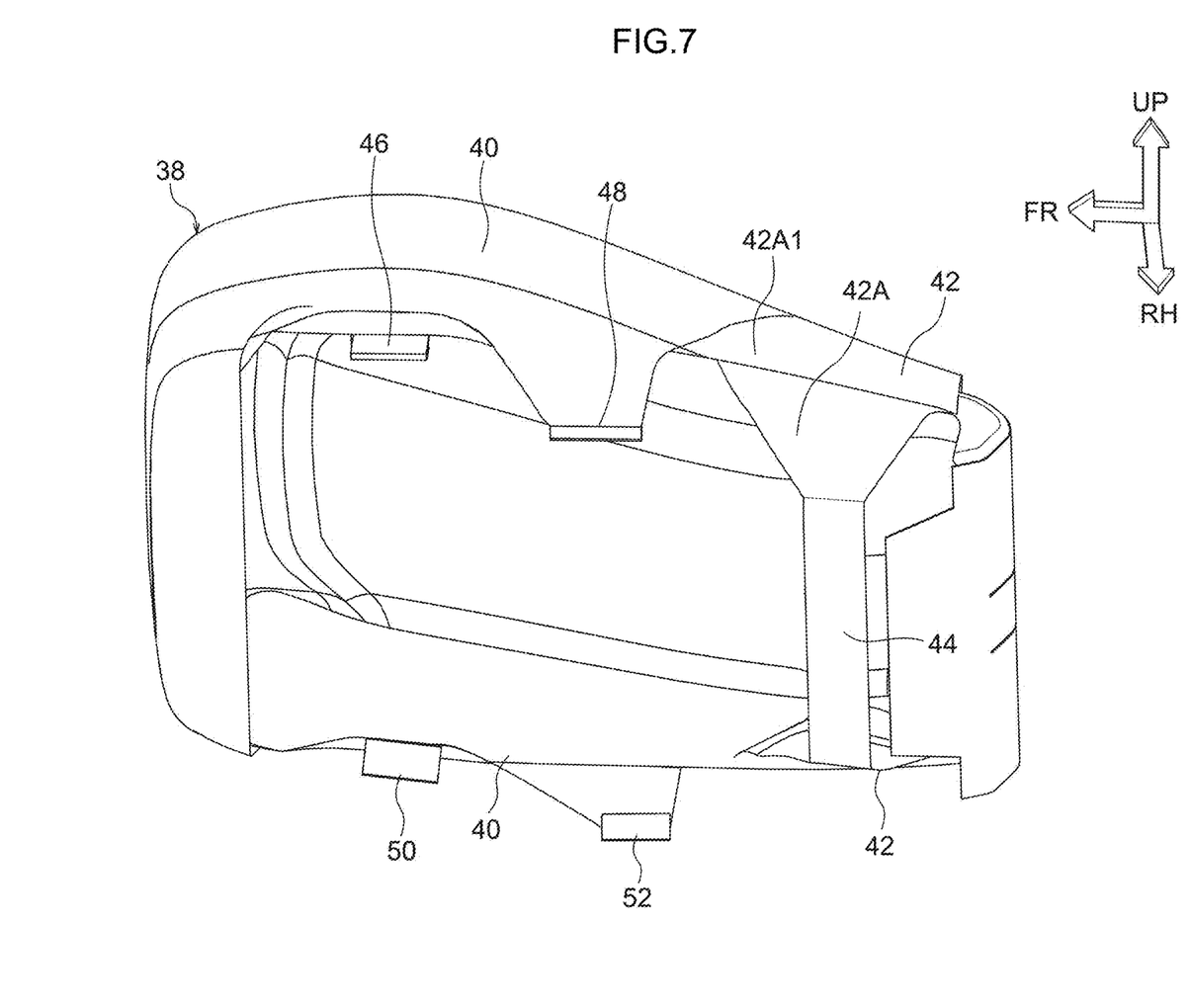
FIG. 7 is a view illustrating a state in which a cushion pad is removed from a configuration illustrated in FIG. 6.

As illustrated in FIG. 1, the vehicle seat 10 according to the present embodiment includes a seat cushion 12 on which an occupant of a vehicle is seated, a seat back 14 that supports a back of the occupant, and a headrest 16 that supports a head of the occupant. The vehicle seat 10 is, for example, a front seat disposed at a right side of a vehicle interior. When the vehicle seat 10 is disposed at a left side of the vehicle interior, the configuration is bilaterally symmetrical with that of the present embodiment.

As illustrated in FIGS. 1 to 7, the seat cushion 12 includes a cushion frame 18 which is a skeleton, a cushion pad 36 which is a cushion material, and a cushion skin 38 which is a trim cover. The cushion pad 36 is supported by the cushion frame 18, and the cushion skin 38 covers the cushion pad 36. The seat cushion 12 is a side support portion 12S in which both left-right side portions bulge upward than a left-right intermediate portion.

The cushion frame 18 includes a pair of left and right side frames 20 disposed at left and right side portions of the seat cushion 12 and extending in a front-rear direction, a front pan 22 bridged between upper end portions of front portions of the left and right side frames 20, and a rear frame 24 bridged between rear end portions of the left and right side frames 20.

The left and right side frames 20 are formed in an elongated shape, for example, by press-molding a sheet metal, and are disposed in a posture in which a longitudinal direction is along the front-rear direction and a thickness direction is along the left-right direction. The front pan 22 is formed in a substantially rectangular shape by the sheet metal, for example, and is disposed in a posture in which a thickness direction is along an up-down direction, and both end portions in the left-right direction are fixed to the front portions of the left and right side frames 20 by welding or the like. The rear frame 24 is formed of, for example, a metal pipe, and is disposed in a posture in which an axial direction is along the left-right direction, and both end portions in the left-right direction are rotatably connected to the rear end portions of the left and right side frames 20 by caulking or the like.

Lower end portions of frames (not illustrated) of the seat back 14 are connected to the rear end portions of the left and right side frames 20 via a known reclining mechanism 26 (see FIG. 1) so as to be reclinable. The left and right side frames 20 are connected to a floor of the vehicle via a seat slide mechanism 28 and a lifter mechanism 30 (see FIG. 1), and a position of the cushion frame 18 can be adjusted in the front-rear direction and in the up-down direction with respect to the floor of the vehicle.

A plural (here, four) S springs 34 configuring a cushion spring 32 are bridged between the front pan 22 and the rear frame 24. The S springs 34 are, for example, formed by bending a linear spring material into a wave shape, and are arranged side by side in the left-right direction. Note that the cushion frame 18 may include a pan frame instead of the front pan 22 and the cushion spring 32. In this case, the pan frame is formed in a tray shape by press-molding a sheet metal, for example, and both left and right end portions are fixed to the left and right side frames 20.

The cushion pad 36 is supported from the lower side by the cushion frame 18 and the cushion spring 32. The cushion pad 36 is made of foam such as urethane foam, for example, and is attached to the cushion frame 18 from the upper side.

In the cushion pad 36, a portion located on the upper side of the cushion spring 32 is elastically supported by the cushion spring 32. When the cushion frame 18 includes a pan frame instead of the front pan 22 and the cushion spring 32, the cushion pad 36 is supported by the pan frame.

Figure 8:
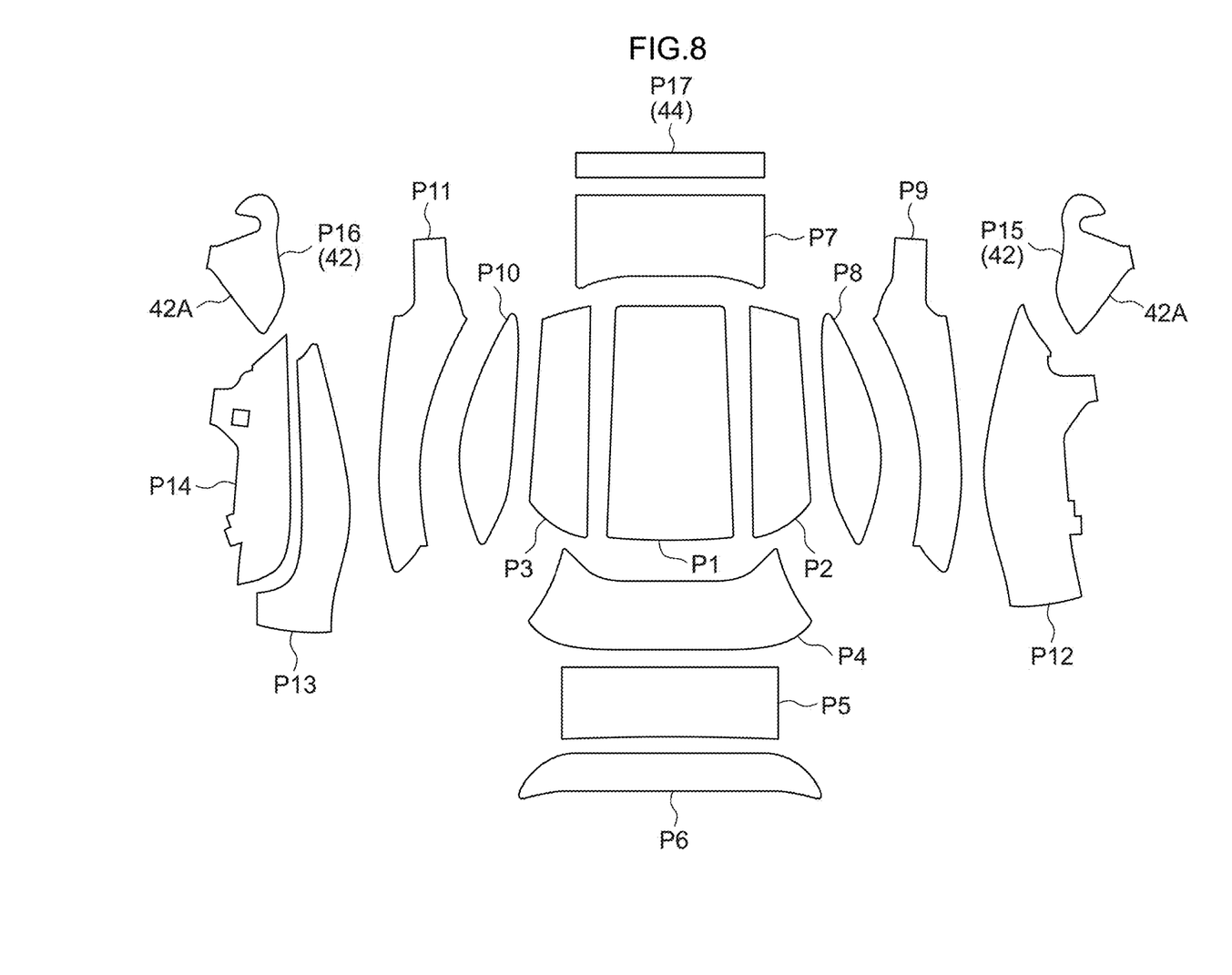
FIG. 8 is an exploded view illustrating a cushion skin of the seat cushion according to the embodiment.

The cushion skin 38 has a bag shape with the lower side open, and covers the cushion pad 36 from the upper side. As an example, the cushion skin 38 is formed by sewing a plural skin pieces P1 to P17 illustrated in FIG. 8. Adjacent skin pieces P1 to P16 in FIG. 8 are sewn to each other. The skin piece P17 is sewn to the skin piece P15 and the skin piece P16, and connects the skin piece P15 and the skin piece P16. The skin pieces P1 to P16 are made of, for example, a cloth material, leather, or synthetic leather, and the skin piece P17 is made of, for example, a cloth material, leather, synthetic leather, or rubber.

The skin pieces P1, P2, P3, and P4 are disposed at the left-right intermediate portion of the upper surface of the seat cushion 12, The skin piece P5 is disposed at the front surface of the seat cushion 12. The skin piece P6 is disposed at the lower surface of the front portion of the seat cushion 12. The skin piece P7 is disposed at the lower surface of the rear portion of the seat cushion 12, The skin pieces P8 and P9 are disposed at the upper surface of the left side support portion 12S of the seat cushion 12. The skin pieces P10 and P11 are disposed at the upper surface of the right side support portion 12S of the seat cushion 12. The skin piece P12 is disposed at the left side surface of the seat cushion 12. The skin pieces P13 and P14 are disposed at the right side surface of the seat cushion 12. The skin piece P15 is disposed at the left side surface of the seat cushion 12 at the rear of the skin piece P12. The skin piece P16 is disposed at the right side surface of the seat cushion 12 at the rear of the skin pieces P13 and P14. The skin piece P17 is disposed at the lower side of the rear portion of the cushion pad 36 and the upper side of the cushion spring 32.

The skin piece P12 configures a left side surface skin front portion 40. The skin piece P13 and the skin piece P14 configure a right side surface skin front portion 40. The skin piece P15 configures a left side surface skin rear portion 42. The skin piece P16 configures a right side surface skin rear portion 42. The skin piece P17 configures a connecting portion 44. The left and right side surface skin front portions 40 are disposed at front portions of the left and right side surfaces of the seat cushion 12 and at a front-rear intermediate portion, and the left and right side surface skin rear portions 42 are disposed at rear portions of the left and right side surfaces of the seat cushion 12. The connecting portion 44 has an elongated strip shape whose longitudinal direction is the left-right direction, and is disposed in close contact with the lower surface of the rear portion of the cushion pad 36.

A J hook (not illustrated) is sewn to an edge portion of the skin piece P6 on a side opposite to the skin piece P5. A front end portion of the cushion skin 38 is fixed to the cushion frame 18 by the J hook being hooked to the front end portion of the cushion frame 18. A J hook (not illustrated) is sewn to an edge portion of the skin piece P7 on a side opposite to the skin piece P1. The J hook is hooked on a trim wire (not illustrated) attached to the rear portion of the cushion frame 18. As a result, the rear end portion of the cushion skin 38 is fixed to the cushion frame 18 via the trim wire.

In the skin piece P12 configuring the left side surface skin front portion 40, two front and rear J hooks 46 and 48 (see FIGS. 2 to 7) are sewn to an edge portion on a side opposite to the skin piece P9, These J hooks 46 and 48 are hooked on the left side frame 20. As a result, the front portion of the left end portion of the cushion skin 38 and the front-rear intermediate portion are locked to the cushion frame 18. The front and rear J hooks 46 and 48 have an elongated shape whose longitudinal direction is the front-rear direction, and are arranged along the front-rear direction. The J hook 48 on the rear side is disposed slightly on an inner side in the left-right direction than the J hook 46 on the front side.

In the skin piece P14 configuring a part of the right side surface skin front portion 40, two front and rear J hooks 50 and 52 (see FIGS. 2 to 7) are sewn to an edge portion on a side opposite to the skin piece P13. These J hooks 50 and 52 are hooked on the right side frame 20. As a result, the front portion of the right end portion of the cushion skin 38 and the front-rear intermediate portion are locked to the cushion frame 18. The front and rear J hooks 50 and 52 have an elongated shape whose longitudinal direction is the front-rear direction, and are arranged along the front-rear direction. The J hook 52 on the rear side is disposed slightly on the inner side in the left-right direction than the J hook 50 on the front side. The J hooks 46, 48, 50, and 52 correspond to "fixtures" in the present disclosure.

The front edge portion of the skin piece P15 configuring the left side surface skin rear portion 42 is sewn to the rear edge portion of the skin piece P12 configuring the left side surface skin front portion 40. Similarly, the front edge portion of the skin piece P16 configuring the right side surface skin rear portion 42 is sewn to each of the rear edge portions of the skin piece P13 and the skin piece P14 configuring the left side surface skin front portion 40. As a result, the left and right side surface skin rear portions 42 are connected to the left and right side surface skin front portions 40. The skin piece P15 configuring the left side surface skin rear portion 42 is also sewn to the skin piece P9 disposed in the left side support portion 12S. The skin piece P16 configuring the right side surface skin rear portion 42 is also sewn to the skin piece P11 disposed in the right side support portion 12S.

The skin piece P15 and the skin piece P16 configuring the left and right side surface skin rear portions 42 are connected in the left-right direction by the skin piece P17 configuring the connecting portion 44, Specifically, the left and right side surface skin rear portions 42 have lower extending portions 42A extending downward of the rear portion of the cushion pad 36. A left end portion (one end portion in the longitudinal direction) of the connecting portion 44 is sewn to a distal end portion of the lower extending portion 42A on the left side, and a right end portion (the other end portion in the longitudinal direction) of the connecting portion 44 is sewn to a distal end portion of the lower extending portion 42A on the right side. As a result, the left and right side surface skin rear portions 42 are connected in the left-right direction by the connecting portion 44, and the rear portion of the cushion skin 38 including the left and right side surface skin rear portions 42 and the connecting portion 44 is restrained by the cushion pad 36. The distal end portion of each lower extending portion 42A and the connecting portion 44 are continuous without a step.

Each lower extending portion 42A expands toward the front side and the rear side as it goes toward the outer side in the left-right direction (the dimension in the front-rear direction increases). The front end portion of each lower extending portion 42A is located in the vicinity of the rear side of the sewing point between the left and right side surface skin rear portions 42 and the left and right side surface skin front portions 40. In each lower extending portion 42A, the front side in the front-rear direction expands wider outward in the left-right direction than the rear side. Specifically, as illustrated in FIGS. 3, 4, 6, and 7, a widened portion 42A1 obtained by expanding each lower extending portion 42A wider outward in the left-right direction is provided in a front side portion of each lower extending portion 42A.

Next, actions and effects of the present embodiment will be described.

In the vehicle seat 10 having the above-described configuration, the cushion skin 38 covering the cushion pad 36 of the seat cushion 12 includes the left and right side surface skin front portions 40, the left and right side surface skin rear portions 42, and the connecting portion 44. The left and right side, surface skin front portions 40 are disposed at the left and right side surfaces of the seat cushion 12, and are fixed to the cushion frame 18 of the seat cushion 12. The left and right side surface skin rear portions 42 are disposed at the left and right side surfaces of the seat cushion 12 at the rear of the left and right side surface skin front portions 40, are connected to the left and right side surface skin front portions 40, and each have a lower extending portion 42A extending downward of the rear portion of the cushion pad 36. The connecting portion 44 is disposed at the lower side of the rear portion of the cushion pad 36, and connects the distal end portions of each lower extending portion 42A of the left and right side surface skin rear portions 42 in the left-right direction. As a result, the rear portion of the cushion skin 38 including the left and right side surface skin rear portions 42 and the connecting portion 44 is restrained by the cushion pad 36.

When the occupant gets in the vehicle, the buttocks and thighs of the occupant rub against the vehicle outer portion of the cushion skin 38 (here, a portion disposed at the right side support portion 12S), so that the vehicle outer portion of the cushion skin 38 tends to be displaced to the vehicle inner side. At this time, since the rear portion of the cushion skin 38 not fixed to the cushion frame 18 is easily displaced to the vehicle inner side, a high tension is hardly generated in a part of the cushion skin 38, In addition, in each lower extending portion 42A of the left and right side surface skin rear portions 42 connected to the left and right side surface skin front portions 40, the front side in the front-rear direction expands wider outward in the seat left-right direction than the rear side, so that the side surface skin rear portion 42 on the vehicle outer side easily follows the displacement of the side surface skin front portion 40 on the vehicle outer side. As a result, it is possible to suppress generation of wrinkles in the cushion skin 38.

Figure 9:
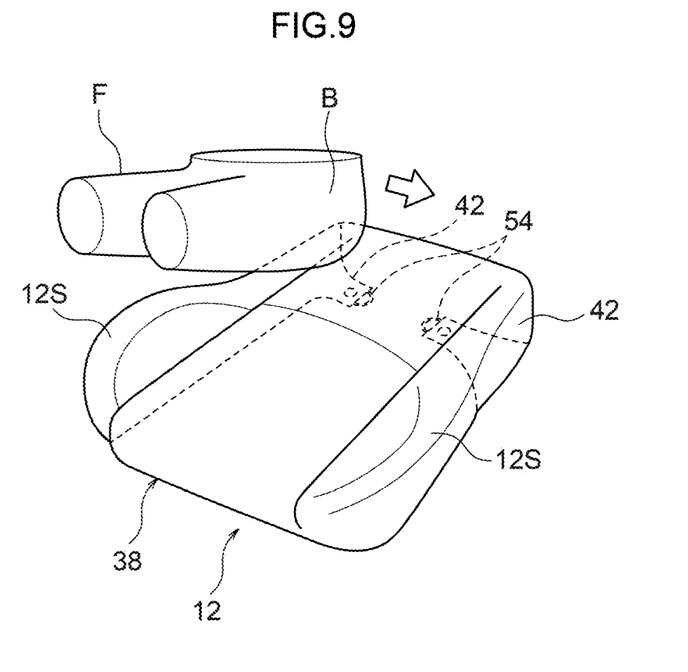
FIG. 9 is a perspective view illustrating a situation when buttocks and thighs of an occupant in a vehicle are rubbed against a cushion skin of a seat cushion according to a comparative example.
Figure 10:
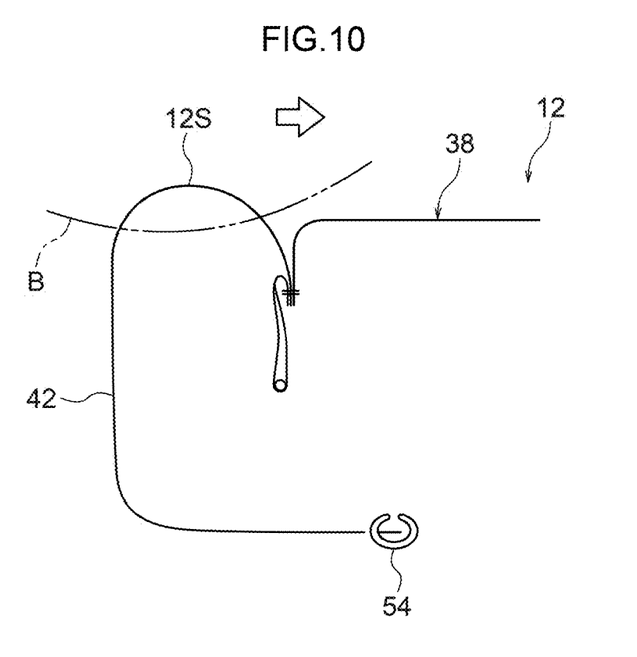
FIG. 10 is a cross-sectional view of the seat cushion according to the comparative example, and is a view illustrating a situation illustrated in FIG. 9.

The above effect will be supplementarily described with reference to FIGS. 9 to 14, In a comparative example schematically illustrated in FIGS. 9 and 10, the left and right side surface skin rear portions 42 of the cushion skin 38 are fixed to a cushion frame (not illustrated in FIGS. 9 and 10) by a hog ring 54. At the time of this fixing, since the left and right side surface skin rear portions 42 are pulled, an excessive tension is generated in the rear portion of the cushion skin 38 at a normal time.

In this comparative example, the buttocks B and the thighs F of the occupant who is about to get in the vehicle rub against the cushion skin 38 at the side support portion 12S on the vehicle outer side, whereby a high tension is generated in the vehicle outer portion of the cushion skin 38. At this time, since a length of the cushion skin 38 covering the cushion pad 36 is longer on the front side of the side support portion 12S than on the rear side of the side support portion 12S, the front side of the side support portion 12S falls down to the vehicle inner side, and the rear side of the side support portion 12S hardly falls down to the vehicle inner side. As a result, the tension of the cushion skin 38 increases at a part of the cushion skin 38. As such a tension is repeatedly generated, wrinkles Was illustrated in FIG. 13 may be generated in the cushion skin 38.

Figure 11:
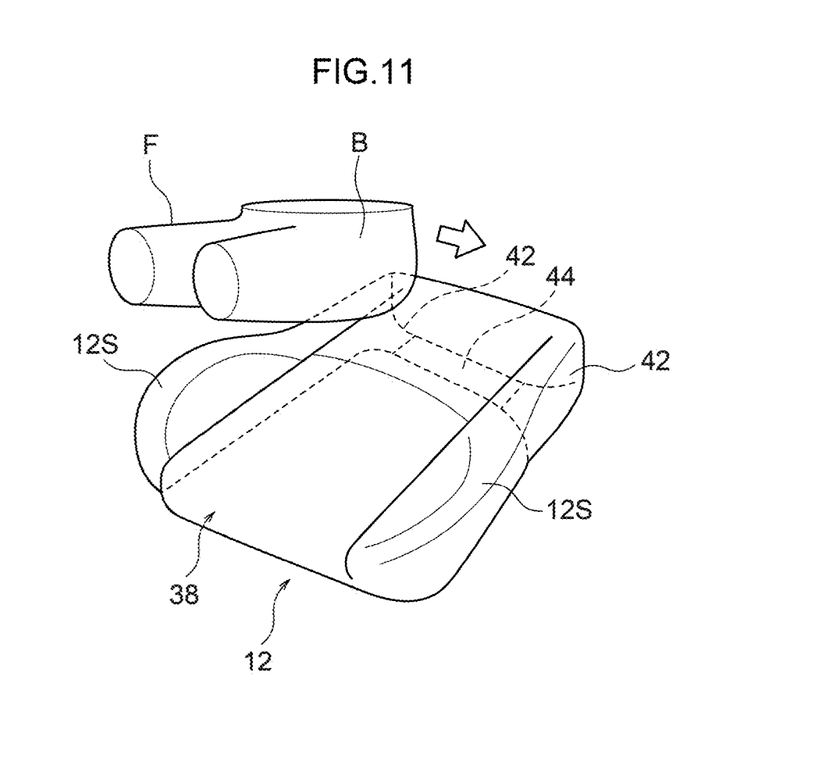
FIG. 11 is a perspective view illustrating a situation when buttocks and thighs of an occupant in a vehicle are rubbed against the cushion skin of the seat cushion according to the embodiment.
Figure 12:
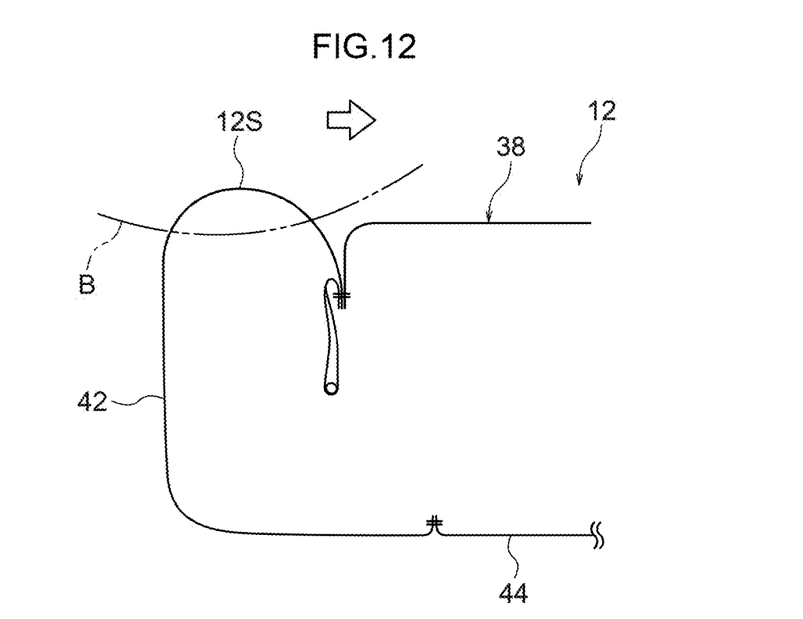
FIG. 12 is a cross-sectional view of the seat cushion according to the embodiment, and is a view illustrating a situation illustrated in FIG. 11.
Figure 13:
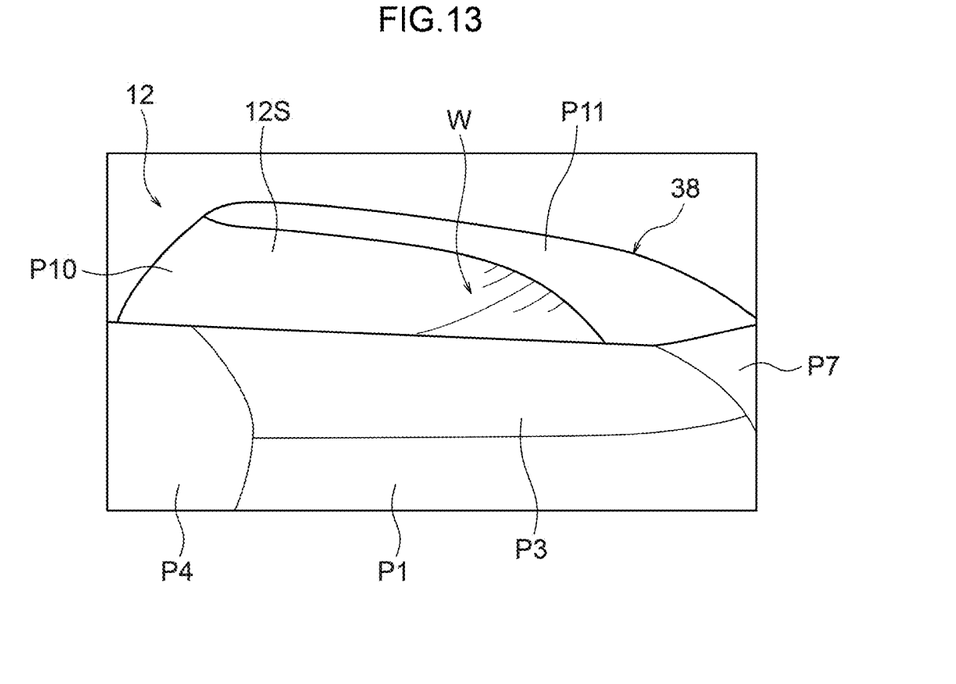
FIG. 13 is a plan view illustrating a part of the seat cushion according to the comparative example, and is a view illustrating a state in which wrinkles have been generated on the cushion skin.
Figure 14:
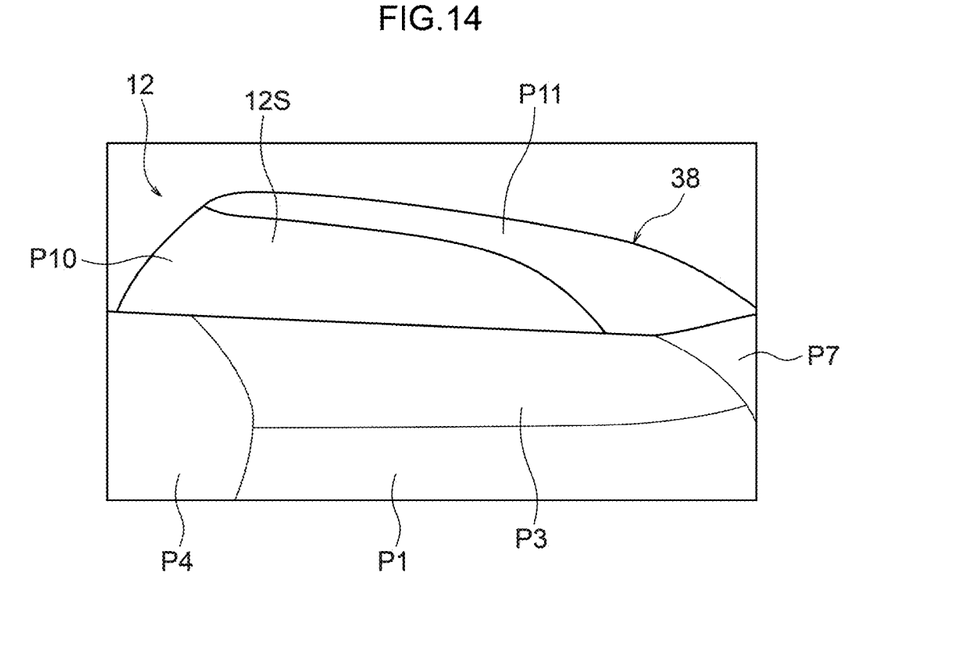
FIG. 14 is a plan view illustrating a part of the seat cushion according to the embodiment.

On the other hand, in the present embodiment schematically illustrated in FIGS. 11 and 12, since the rear portion of the cushion skin 38 is not fixed to the cushion frame 18 (not illustrated in FIGS. 11 and 12), and the left and right side surface skin rear portions 42 are connected by the connecting portion 44, an excessive tension is not generated in the rear portion of the cushion skin 38 at the normal time. Therefore, when the buttocks B and the thighs F of the occupant who is about to got in the vehicle rub against the cushion skin 38 at the side support portion 12S on the vehicle outer side, not only the front side of the side support portion 12S but also the rear side of the side support portion 12S easily falls down to the vehicle inner side. In addition, since the widened portion 42A1 is provided in the front side portion of the lower extending portion 42A of the side surface skin rear portion 42, the side surface skin rear portion 42 easily follows the side surface skin front portion 40, and thus, the tension of the cushion skin 38 is suppressed from becoming high at a part of the cushion skin 38. As a result, as illustrated in FIG. 14, it is possible to suppress generation of wrinkles in the cushion skin 38.

In the present embodiment, the left and right side surface skin front portions 40 are fixed to the cushion frame 18 by the J hooks 46, 48, 50, and 52 arranged along the front-rear direction. As a result, when the occupant gets in the vehicle, the vehicle outer portion of the cushion skin 38 is less likely to be displaced to the vehicle inner side, and the side surface skin rear portion 42 on the vehicle outer side follows the displacement of the side surface skin front portion 40 on the vehicle outer side, so that a part of the cushion skin 38 is less likely to be twisted. As a result, generation of wrinkles on the cushion skin 38 can be more effectively suppressed.

In the present embodiment, the J hooks 48 and 52 on the rear side are disposed slightly on an inner side in the left-right direction than the J hooks 46 and 50 on the front side. As a, result, the rear side portions of the left and right side surface skin front portions 40 are strongly pulled in with respect to the cushion frame 18, so that displacement of the rear side portions of the left and right side surface skin front portions 40 is suppressed. This also makes it possible to suppress the generation of the wrinkle.

In the present embodiment, since the distal end portion of each lower extending portion 42A and the connecting portion 44 are continuous without a step, the side surface skin rear portion 42 on the vehicle outer side follows the displacement of the side surface skin front portion 40 on the vehicle outer side in a well-balanced manner. Specifically, as described above, when the buttocks B and the thighs F of the occupant who is about to get in the vehicle rub against the cushion skin 38 at the side support portion 12S on the vehicle outer side, not only the front side of the side support portion 12S but also the rear side of the side support portion 12S easily falls down to the inside of the vehicle. At this time, since the side surface skin front portion 40 is connected to the left and right by the connecting portion 44 via the widened portion 42:1 and the lower extending portion 42A, the side surface skin rear portion 42 easily follows the fall down of the side support portion US.

In the present embodiment, the left and right side surface skin rear portions 42 disposed at the left and right side surfaces of the seat cushion 12 at the rear of the left and right side surface skin front portions 40 have the lower extending portions 42A extending downward of the rear portion of the cushion pad 36, and the distal end portions of each lower extending portion 42E are connected in the left-right direction by the connecting portion. Each lower extending portion 42A expands as it goes toward the front side (that is, the side of the left and right side surface skin front portions 40 fixed to the cushion frame 18) as it goes toward the outer side in the left-right direction. As a result, the rear portion of the cushion skin 38 including the left and right side surface skin rear portions 42 is less likely to be displaced in the left-right direction with respect to the cushion frame 18 and the cushion pad 36.

Figure 15:
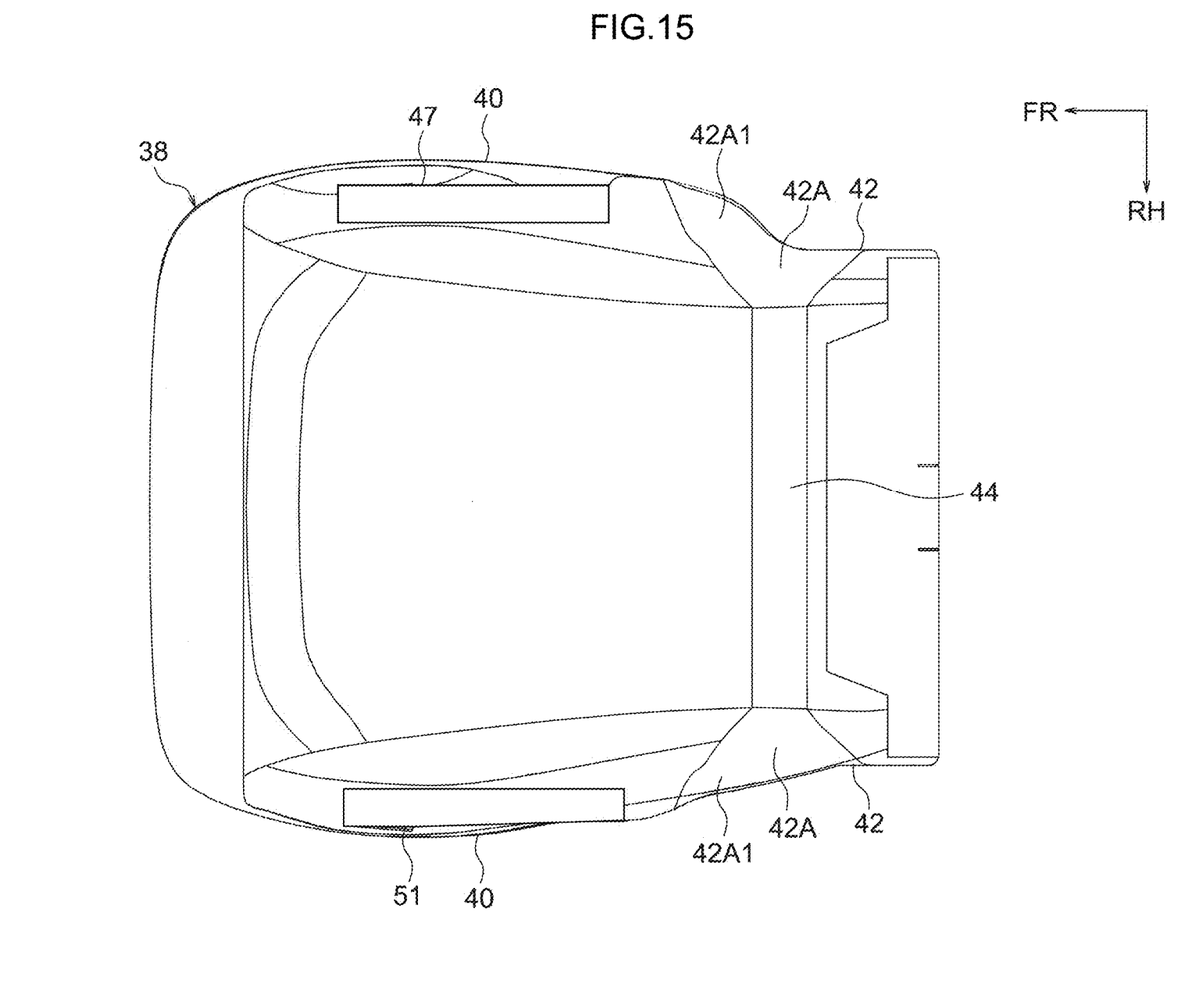
FIG. 15 is a bottom view illustrating a modification of the cushion skin according to the embodiment.

In the above embodiment, the left side surface skin front portion 40 is fixed to the cushion frame 18 by the two front and rear J hooks 46 and 48, and the right side surface skin front portion 40 is fixed to the cushion frame 18 by the two front and rear J hooks 50 and 52, but the present disclosure is not limited thereto. As in the modification illustrated in FIG. 15, the left side surface skin front portion 40 may be fixed to the cushion frame 18 by one J hook 47, and the right side surface skin front portion 40 may be fixed to the cushion frame 18 by one J hook 51, These J hooks 47 and 51 correspond to "fixtures" in the present disclosure.

In addition, the present disclosure can be variously modified without departing from the gist thereof. It is a matter of course that the scope of rights of the present disclosure is not limited to the above embodiments.

What is claimed is:

1. A cushion skin covering a cushion pad of a seat cushion of a vehicle seat, the cushion skin comprising:
   left and right side surface skin front portions that are respectively disposed at left and right side surfaces of the seat cushion and are fixed to a cushion frame of the seat cushion;
   left and right side surface skin rear portions that are respectively disposed at the left and right side surfaces of the seat cushion at a seat rear side of the left and right side surface skin front portions, that are respectively connected to the left and right side surface skin front portions, and that each have a lower extending portion extending downward of a rear portion of the cushion pad; and
   a connecting portion that is disposed at a lower side of the rear portion of the cushion pad and connects distal end portions of each lower extending portion of the left and right side surface skin rear portions in a seat left-right direction,
   wherein, in each lower extending portion, a front side in a seat front-rear direction expands wider outward in the seat left-right direction than a rear side.

2. The cushion skin according to claim 1, wherein the left and right side surface skin front portions are fixed to the cushion frame by one or a plurality of fixtures disposed along the seat front-rear direction.

3. A seat cushion, comprising:
   a cushion frame;
   a cushion pad that is supported by the cushion frame; and
   the cushion skin according to claim 1, the cushion skin covering the cushion pad.

4. A vehicle seat, comprising:
   the seat cushion according to claim 3;
   a seat back that supports a back of an occupant seated on the seat cushion; and
   a headrest that supports a head of the occupant.

* * * * *

UNITED STATES PATENT AND TRADEMARK OFFICE
CERTIFICATE OF CORRECTION

| | | |
|---|---|---|
| PATENT NO. | : 12,420,686 B2 | |
| APPLICATION NO. | : 18/482534 | |
| DATED | : September 23, 2025 | |
| INVENTOR(S) | : Syunji Takazawa | |

It is certified that error appears in the above-identified patent and that said Letters Patent is hereby corrected as shown below:

In the Specification

In Column 3, Line 36, delete "the embodiment:" and insert --the embodiment;--.

In Column 5, Line 19, delete "cushion 12, The" and insert --cushion 12. The--.

In Column 5, Line 23, delete "cushion 12, The" and insert --cushion 12. The--.

In Column 5, Line 66, delete "piece P9, These" and insert --piece P9. These--.

In Column 6, Line 41, delete "portion 44, Specifically," and insert --portion 44. Specifically,--.

In Column 7, Line 13, delete "right side, surface" and insert --right side surface--.

In Column 7, Line 38, delete "skin 38, In" and insert --skin 38. In--.

In Column 7, Line 49, delete "to 14, In" and insert --to 14. In--.

In Column 8, Line 13, delete "to got in" and insert --to get in--.

In Column 8, Line 40, delete "As a, result," and insert --As a result,--.

In Column 8, Line 60, delete "portion 42:1 and" and insert --portion 42A1 and--.

In Column 8, Line 62, delete "portion US." and insert --portion 12S.--.

Signed and Sealed this
Third Day of February, 2026

John A. Squires
*Director of the United States Patent and Trademark Office*

In Column 9, Line 2, delete "portion 42E are" and insert --portion 42A are--.

In Column 9, Line 21 (Approx.), delete "hook 51, These" and insert --hook 51. These--.